US012106260B2

(12) United States Patent
Kuck et al.

(10) Patent No.: US 12,106,260 B2
(45) Date of Patent: Oct. 1, 2024

(54) MONITORING A VEHICLE CARGO SPACE FOR OBJECTS CONNECTED TO BEACON-TRANSMITTING DEVICES

(71) Applicant: FORD GLOBAL TECHNOLOGIES, LLC, Dearborn, MI (US)

(72) Inventors: Detlef Kuck, Inden (DE); Marcel Grein, Geilenkirchen (DE); Nicole Eikelenberg, Meerssen (NL); Walter Pijls, Oirsbeek (NL); Jörg Christian Kirchhof, Hilden (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 388 days.

(21) Appl. No.: 17/745,066

(22) Filed: May 16, 2022

(65) Prior Publication Data
US 2022/0398534 A1    Dec. 15, 2022

(30) Foreign Application Priority Data

Jun. 11, 2021    (DE) .......................... 102021115220.8

(51) Int. Cl.
*G06Q 10/0833* (2023.01)
*H04B 17/318* (2015.01)

(52) U.S. Cl.
CPC ....... *G06Q 10/0833* (2013.01); *H04B 17/318* (2015.01)

(58) Field of Classification Search
CPC .. G06Q 10/0833; G06Q 10/08; H04B 17/318; H04B 17/27; H04B 17/00; G01S 1/68
See application file for complete search history.

(56) References Cited

U.S. PATENT DOCUMENTS 9,872,146 B2 *   1/2018   Mycek ................. H04W 48/10
10,132,911 B1 *  11/2018  Bullock .................... B60P 7/15
(Continued)

FOREIGN PATENT DOCUMENTS

| CN | 110458256 A | 11/2019 |
|----|-------------|---------|
| DE | 102019113227 A1 | 11/2020 |
| WO | 2017197409 A1 | 11/2017 |

*Primary Examiner* — Manuel A Rivera Vargas
(74) *Attorney, Agent, or Firm* — Frank L. Lollo; MacMillan, Sobanski & Todd, LLC

(57) ABSTRACT

A cargo space is monitored for objects connected to respective beacon-transmitting devices which transmit identification signals associated with the objects. Signal strengths of received signals and repetition periods associated therewith are determined using a monitoring device which checks whether each received beacon identification signal identifies a respective object in an object inventory of the cargo space based on comparisons of the signal strengths with current signal strength threshold values respectively associated with them and on comparisons of the respectively associated beacon repetition periods with respective current repetition period threshold values. The monitoring device detects whether the cargo space is currently in a first state (in which loading and unloading operations of objects in the cargo space is permissible) or a second state (in which loading and unloading is not permissible). The monitoring device adjusts signal strength threshold values and repetition period threshold values only during the second state.

20 Claims, 6 Drawing Sheets

(56) References Cited

U.S. PATENT DOCUMENTS

| | | |
|---|---|---|
| 10,157,337 B1 | 12/2018 | Kantor et al. |
| 10,197,661 B1 | 2/2019 | Girimaji et al. |
| 10,872,311 B2 | 12/2020 | Tingler et al. |
| 2020/0405223 A1 | 12/2020 | Mai et al. |

\* cited by examiner

MONITORING A VEHICLE CARGO SPACE FOR OBJECTS CONNECTED TO BEACON-TRANSMITTING DEVICES

CROSS REFERENCE TO RELATED APPLICATIONS

This application claims priority to application DE102021115220.8, filed in the German Patent and Trademark Office on Jun. 11, 2021, which is incorporated herein by reference in its entirety.

STATEMENT REGARDING FEDERALLY SPONSORED RESEARCH

Not Applicable.

BACKGROUND OF THE INVENTION

The present invention relates to a method and a system for monitoring an object inventory in a cargo space for objects connected to beacon-transmitting devices, a vehicle equipped with such a system, and a computer program product and a computer-readable data carrier.

A vehicle cargo space is a storage space in which various objects can be loaded, i.e. a storage space that can be loaded with objects and from which objects can be unloaded. In particular, a cargo space may be a cargo space of a vehicle, for example the cargo space of a commercial motor vehicle, a delivery van, or a trunk or other interior space of any other motor vehicle. A cargo space in the sense of the present invention does not require delimitation by walls. The space above an open loading area, for example an open loading area of a commercial vehicle, is also referred to herein as cargo space. A vehicle herein with a cargo space is in particular a motor vehicle, but ships, airplanes, or railroad cars for example may also have cargo spaces of which the object inventory can be monitored via the method presented. In some embodiments, a storage room or other interior space of a property or any other monitorable area of interest may also be a cargo space in the sense of the present invention.

In order to keep an up-to-date overview of an inventory of objects in a cargo space, even if they may be located at previously unspecified places within the cargo space and/or may be unloaded and reloaded several times, for example, wherein the arrangement of the objects in the cargo space may change each time, there is a wide range of monitoring options, often optimized for a specific application. Thus, object inventory monitoring may be useful for example when tradesmen want to keep an overview of whether the tools, spare parts, and other work equipment provided in the company vehicle are actually on board, both before and after respective job assignments. A delivery vehicle in which goods or parcels to be delivered at various locations are transported is also suitable for use of the presented system. However, the terms "object" and "object stock" are not limited to tools or objects to be transported or stored, but refer to all countable entities, for example also humans or animals, if they carry a corresponding beacon-transmitting (i.e., tracking) device. Thus, the system presented here may for example also be used to monitor stock of a livestock transporter, or whether all members of a tour group are on the bus. The object inventory of the cargo space is the totality of all objects that can be monitored via the presented method and which are currently located in the cargo space.

Published patent application US2020/0405223A1 describes a system for automatic and adaptive monitoring of objects, in which a transmitter transmits to a receiver via a wireless transmission channel, wherein the multipath received signals modulated by the environment and a detected motion of a monitored object are evaluated in order to adjust the reception to the respective current channel state, in order to optimize the tracking of the object.

U.S. Pat. No. 10,872,311B2 describes a system via which objects or customers equipped with an array of radio-frequency identification (RFID) transmitters can be tracked in a retail store. At least one of the customer's transmitters is always to be detectable via a receiving antenna.

In U.S. Pat. No. 10,197,661B1, it is provided that a device having two operating states receives beacon identification signals from beacon transmitters in a first state and determines the received signal strength. If said signal strength exceeds a threshold value, the device emits signal bursts in the ultrasonic and/or infrared range in a second state, in order to use them to locate the position of the beacon transmitter.

Published patent application CN110458256A presents a load management system in which the distance of objects from a loading area is determined using ultrasonic sensors, and the objects are identified by evaluating signals from RFID transmitters attached to them.

U.S. Pat. No. 9,462,357B2 describes an automatic object tracking system in which tools are equipped with RFID transmitters, and suitable receivers are used to determine the range of the receiver in which the tool is located, or whether it is out of range of the transmitter monitoring the destination position.

U.S. Pat. Nos. 8,970,377B2 and 9,640,054B2 respectively show a tracking system for objects, in particular tools, from a cargo space. The objects have RFID transmitters and the cargo space has a suitable receiver, wherein when the object is removed from the cargo space, it is booked out of the inventory list. A piece of information about whether the cargo space is closed, possibly combined with a piece of movement information if the cargo space is part of a vehicle, is used as a trigger to determine whether sufficiently strong signals are again received from the cargo space for all objects. If this is not the case, the position of the missing object may be captured and displayed using GPS, or the intended position of the missing object in the cargo space may be displayed.

The known systems and methods described in the above prior art require, for example, the actual determination or tracking of the object position using additional detection systems such as GPS or ultrasound, or they impose requirements on the state of motion or position of an object, require a plurality of receivers and/or transmitters, or do not provide for adaptation to different reception situations, and are therefore complex and/or potentially error-prone.

SUMMARY OF THE INVENTION

An object of the present invention is to provide a possibility for monitoring an object inventory in a cargo space, which ensures an accurate determination of the object inventory in the cargo space in a simple and robust manner, even under different scenarios or scenarios that change over time.

Such an object is achieved according to the present invention via a method for monitoring an object inventory in a cargo space for objects connected to beacon-transmitting devices, as well as a system for monitoring an object inventory in a cargo space for objects connected to beacon-transmitting devices.

According to a first aspect of the present invention, a method for monitoring an object inventory in a cargo space for objects connected to beacon-transmitting devices (wherein the beacon-transmitting devices transmit beacon identification signals individually associated with the respective objects) comprises the step of receiving, via a beacon-receiving device, of beacon identification signals from at least one monitored cargo space, a determination of signal strengths, via a monitoring device connected to the beacon receiving device, of received beacon identification signals and beacon repetition periods associated therewith. Further, a check is made, via the monitoring device, of whether the received beacon identification signals identify objects in an object inventory of the cargo space wherein the check is based on comparisons of the signal strengths of the respective received beacon identification signals with current signal strength threshold values respectively associated with them and comparing the respectively associated beacon repetition periods with these respectively associated current repetition period threshold values. In addition, the method comprises the step of detecting, via the monitoring device, whether the cargo space is currently in a first state or a second state. Loading operations of objects connected to beacon-transmitting devices in the cargo space are permissible only in the first state. Only if the cargo space is currently in the second state, an adjustment of the respective current signal strength threshold values and the respective current repetition period threshold values associated with the respective received beacon identification signals is made as a function of the respective associated currently received beacon identification signals and associated beacon repetition periods.

Loading operations comprise loading operations, in which the cargo space is loaded with objects, and unloading operations, in which objects are unloaded from the cargo space. Loading operations are permissible only in the first state of the cargo space, i.e., in the context of the presented system, loading operations are carried out only when the cargo space is in the first state; otherwise, they are prohibited. The first state is thus an unstable state, in which the object inventory in the cargo space is not fixed, but can change. In a preferred embodiment, prohibited loading operations are also made impossible by structural or technical measures. A prohibited loading operation is for example the throwing of an object onto an open cargo bed, even if the cargo space, in this case the cargo bed, is in the second state. Another example of a prohibited loading operation is the loading or unloading of a cargo space that is in the second state and which is actually closed, after forcible opening. The second state, on the other hand, is a stable state in which the object inventory in the cargo space is fixed and does not change during this state. The first and second states of the cargo space differ from one other in that the system that carries out the method according to the present invention classifies the cargo space as being in the first or second state based on user input or analysis of state parameters of the cargo space and/or the environment. This may comprise a visible change of state of the cargo space (for example a vehicle with cargo space in motion or not, storage space gate closed or not), but is not limited to visible changes.

A beacon signal is preferably comprised of a radio signal transmitted repeatedly at fixed intervals, e.g., fixed repetition periods, by a beacon-transmitting device. A beacon identification signal is a beacon signal in which the transmitted radio signal transmits an identification, i.e. identifier, which is associated with the beacon transmitter. Beacon identification signals may be used for example with short-range communication systems, for example Bluetooth systems, but also with systems that use longer-range radio signals.

The monitoring device connected to the beacon-receiving device evaluates the beacon identification signals received by the beacon-receiving device. The respective signal strength (i.e., the received field strength) as well as the repetition periods (i.e., the duration of the intervals at which the respective beacon identification signal is repeated) and the identification, which is transmitted with the signal, of the respective beacon transmitter, and thus of the object connected to it, are determined. The magnitude of the signal strength may be represented for example as an RSSI (received signal strength indicator) value. The monitoring device is also configured to carry out the remaining steps of the method. For this purpose, the monitoring device comprises suitable means, in particular an electronically programmable device comprising at least a processor and a memory in which sections of code of a computer program product are stored, which, when executed by the processor, configure the monitoring device to carry out steps of the method. The method may also be referred to as a computer-implemented method, since at least one method step is carried out using a computer program.

A current signal strength threshold value and an associated current repetition period threshold value are associated with each of the received beacon identification signals. In one embodiment, an identical initial signal strength threshold value and an identical initial repetition period threshold value may initially be associated with each of the received beacon identification signals, respectively, prior to the first adjustment step. In a further embodiment, it is provided that different initial signal strength threshold values and initial repetition period threshold values are associated with different types of beacon-transmitting devices. Furthermore, in one embodiment, it is provided that previously determined initial signal strength threshold values and initial repetition period threshold values for beacon identification signals are kept in a memory, if the respective objects with the associated beacon-transmitting devices have already belonged to the object inventory of the cargo space at earlier times.

Thus, the method described comprises providing an individual signal strength threshold value and repetition period threshold value for each of the beacon transmitters of which the beacon identification signal is received, wherein, instead of using static threshold values, exactly when the cargo space is in the second state, in which no permissible loading operation can occur, these individual signal strength threshold values and repetition period threshold values, which are used to decide whether or not the respective associated objects are in the cargo space, are adjusted to the current reception situation. In this way, it is easily taken into account that the respective receiving situation may have changed due to previous loading operations in the first state. For example, objects may have been added to the object inventory for the first time or again, or objects may have been removed from the object inventory, and/or the position of the objects in the cargo space may have changed relative to one other, such that the beacon identification signals could be modulated or attenuated differently due to changed multipath propagation. In addition, the signal strength of the beacon transmitter may also have degraded due to depleted power resources. Whichever reasons may require an adjustment of the threshold values is irrelevant in respect of the presented method.

A system that operates according to the method described does not require means for actual position tracking of the objects using other sensors or a variety of signals, but rather evaluates only the signal strengths of the respective beacon identification signals and the repetition periods thereof, in principle also independently of whether or not the objects are moving. Similarly, it is permissible for different beacon-transmitting devices to use different repetition periods and signal strengths for their beacon identification signals.

By continuously adjusting the threshold values individually when the opportunity arises in the second state, in which it is more likely that the received beacon identification signals will identify objects in the cargo space object inventory, an individually optimized decision can be made for each object as to whether the object is on board, e.g., within the cargo space.

In one embodiment of the method, the detection of whether the cargo space is currently in the first state or the second state comprises determining the second state based on a signal that is received via a user input interface. In that regard, the user communicates via the user input interface that a loading operation has been completed and that no further loading operation will follow for the time being.

In one embodiment in which the cargo space is a part of a vehicle, the detection of whether the cargo space is currently in the first state or the second state comprises determining the second state by detecting movement of the vehicle at a speed above a speed threshold value. The speed threshold value is greater than 0 km/h, preferably at least 5 km/h (kilometers per hour), for example 10 km/h. More preferably, the speed threshold value is greater than a speed of the vehicle at which maneuvers can be performed with the vehicle. For example, the speed threshold value is 30 km/h. Beacon identification signals received in the second state have a very high probability of belonging to objects that are currently in the cargo space of the vehicle, since beacon-transmitting devices outside the vehicle do not remain permanently within the range of the receiving device in the vehicle.

In a preferred embodiment, the method comprises, when the cargo space is currently in the second state, a check for changes in the beacon repetition intervals of the received beacon identification signals, and a classification of an object identified by a respective beacon identification signal as being in the object inventory only if the respectively associated beacon repetition interval remains constant during the current second state. If the cargo space is part of a vehicle and the vehicle is moving at a speed above the speed threshold value, which is at least high enough that the vehicle is likely to perform a maneuver not only in a fixed area, only beacon repetition intervals between beacon identification signals remain constant when the object connected to the associated transmitter device is in the cargo space, so that the current object inventory may be determined in a particularly simple way.

When the cargo space is currently in the first state, a further embodiment of the method comprises the steps of checking whether the received beacon identification signals identify objects in the object inventory of the cargo space, checking whether the current repetition period threshold values respectively associated with beacon repetition periods associated with the respective received beacon identification signals have been exceeded, and classifying the objects associated with the respective beacon identification signals as not being in the object inventory if the respectively associated current repetition period threshold values are exceeded. In one embodiment, the repetition period threshold value corresponds to the repetition period, i.e., the repetition interval of the beacon identification signal. Thus, in the first state, in which loading operations are permissible, it may be determined very quickly in particular whether an unloading operation has just taken place. In a further embodiment, the repetition period threshold value is a function of the repetition period, but is greater, for example greater by a fixed time value, or it corresponds to a multiple length of the repetition period. This increases reliability and ensures that it is not, for example, a short-term reception disturbance.

In a further embodiment, the check of whether the received beacon identification signals identify objects in the object inventory of the cargo hold when the cargo hold is currently in the second state comprises checking whether the signal strengths of the respective received beacon identification signals exceed the current signal strength threshold values respectively associated with them, and classifying an object identified by a respective beacon identification signal as being in the object inventory only if the respectively associated current signal strength threshold value is exceeded. In this simple, robust manner, in the second state, in which no loading operations are permissible, an individualized assessment is made for each object as to whether or not the object is in the cargo space. If the received signal strength is below the current signal strength threshold value associated with the associated beacon identification signal, the object is classified as still being within reception range but not positioned within the cargo space.

In an exemplary embodiment, it is provided that, in order to check whether the signal strengths of the respective received beacon identification signals exceed the current signal strength threshold values respectively associated with them, respectively moving signal strength average values are determined for the signal strengths of the respective received beacon identification signals over associated sliding windows comprising several beacon repetition periods. That is, instead of comparing the actual signal strengths measured in each case with the associated threshold values, moving average values of the respective measured signal strengths are determined over the duration of several beacon repetition periods, and said averages are compared with the threshold values. In this way, the reliability of the respective comparison result may be increased, since the decrease in signal strengths from signals outside the cargo space, which for example in the case of a vehicle, emanate from objects that have previously been unloaded and are initially still located in the vicinity of the vehicle, is only taken into account on a weighted basis and, in addition, it is possible to compensate for momentary reception problems.

In one embodiment of the method, it is provided that the adjustment of the current signal strength threshold values respectively associated with the respective received beacon identification signals, as a function of the respective associated currently received beacon identification signals, comprises, during the second state, determining the respectively associated current signal strength threshold values using a sliding-window function, as a function of a sequence of signal strength values of the respective associated most recently received beacon identification signals. The sliding-window function is for example a moving-average function in which a moving average value over the selected sliding window is determined. In a preferred embodiment, the sliding-window function is a moving-minimum function, in which the moving minimum is determined over the selected sliding window, which is continuously updated as the sliding window is shifted.

In a further embodiment, the adjustment of the respective current signal strength threshold values respectively associated with the respective received beacon identification signals, as a function of the respective associated currently received beacon identification signals, comprises, during the second state, determining the respectively associated current signal strength threshold values using a statistical classification method, as a function of a sequence of signal strength values of the respective associated most recently received beacon identification signals. In an exemplary embodiment, the statistical classification method uses a discriminant function or separation function. In this case, a discriminant analysis is performed in which a score value is associated with each observation, i.e. with each detected signal strength value. The score value is then used to determine a group association of the respective observation and the boundaries between them. Preferably, linear discriminant functions are used.

In yet another embodiment, the adjustment of the respective current signal strength threshold values respectively associated with the respective received beacon identification signals, as a function of the respective associated currently received beacon identification signals, comprises, during the second state, determining the respectively associated current signal strength threshold values using an online machine-learning method, as a function of a sequence of signal strength values of the respective associated most recently received beacon identification signals. In an online machine-learning method, data become available sequentially, in this case bursts of beacon identification signals in a sequence of repetition periods, and with each newly received current beacon identification signal, prediction values for the next expected data or beacon identification signals are continuously updated. In a preferred embodiment, the online machine-learning method comprises an online deep-learning method, i.e. a deep or multilayer learning method, in which at least one artificial neural network comprising a plurality of layers is continuously trained on the basis of the many sequentially incoming input signals, in this case the newly received current beacon identification signals, to decide whether or not the respectively received beacon identification signal belongs to an object in the cargo space. As the operating time continues, optimized, increasingly accurate results are achieved by continuously adjusting or (re)calibrating the current signal strength threshold values and repetition period threshold values respectively associated with the beacon identification signals. In a preferred embodiment, the artificial neural network used is also already trained in advance, preferably in a scenario that is suitable for the current use of the cargo space. In a preferred embodiment, the deep-learning method is used with a Q-learning algorithm, i.e. a reinforcement machine-learning method that does not require a model of the environment.

According to a second aspect of the present invention, a system for monitoring an object inventory in a cargo space for objects connected to beacon-transmitting devices, wherein the beacon-transmitting devices transmit beacon identification signals individually associated with the respective objects, comprises a cargo space for objects connected to beacon-transmitting devices, a beacon-receiving device for receiving beacon identification signals at least from the cargo space, and a monitoring device connected to the beacon-receiving device, wherein the system is configured to carry out a method according to the first aspect of the present invention. In the embodiments, the beacon-transmitting devices may also be comprised by the system. In further embodiments, in addition, the objects connected to the beacon-transmitting devices are also comprised by the system.

In an exemplary embodiment of the system, the cargo space is a portion of a vehicle, for example a trunk, another interior, or a cargo area of a motor vehicle, or a cargo space for example of an airplane, helicopter, ship, or train car. According to a third aspect of the present invention, a vehicle comprises a system according to the second aspect of the present invention.

According to a fourth aspect of the present invention, a computer program product comprises sections of code that, when loaded from a memory into a processor of a programmable device of a system for monitoring an object inventory in a cargo space for objects connected to beacon-transmitting devices, configure the system to carry out a method according to the first aspect of the present invention. In this case, the sections of code, i.e. the program code, of the computer program product, correspond to a computer program that comprises instructions via which the system is caused to carry out steps of the method. In particular, the monitoring device may comprise a programmable device, e.g., a computer, with a processor and a memory. According to a fifth aspect of the present invention, a computer-readable data carrier comprises a computer program product according to the fourth aspect of the present invention. A computer-readable data carrier may be both a computer-readable storage medium and a data carrier signal. A computer-readable storage medium is a medium suitable for storing software, for example a CD-ROM, a DVD, a Blu-Ray disc, a USB stick, a hard disk, etc. A data carrier signal enables wired or wireless transmission of the sections of code.

Thus, the advantages and features of the method according to the present invention for monitoring an object inventory in a cargo space for objects connected to beacon-transmitting devices, including embodiments thereof, are also implemented in the context of a system for monitoring an object inventory in a cargo space for objects connected to beacon-transmitting devices, a vehicle comprising said system, a computer program product, and a computer-readable data carrier.

BRIEF DESCRIPTION OF THE DRAWINGS

Further advantages of the present invention are apparent from the detailed description and the figures. The present invention is also described in greater detail below in connection with the following description of exemplary embodiments with reference to the accompanying figures.

It is understood that other embodiments may be used and structural or logical changes may be made without departing from the scope of protection of the present invention. It is understood that the features of the various exemplary embodiments described above and below may be combined, unless specifically indicated otherwise. Therefore, the description is not to be construed in a limiting sense, and the scope of protection of the present invention is defined by the appended claims.

DETAILED DESCRIPTION OF PREFERRED EMBODIMENTS

Figure 1:
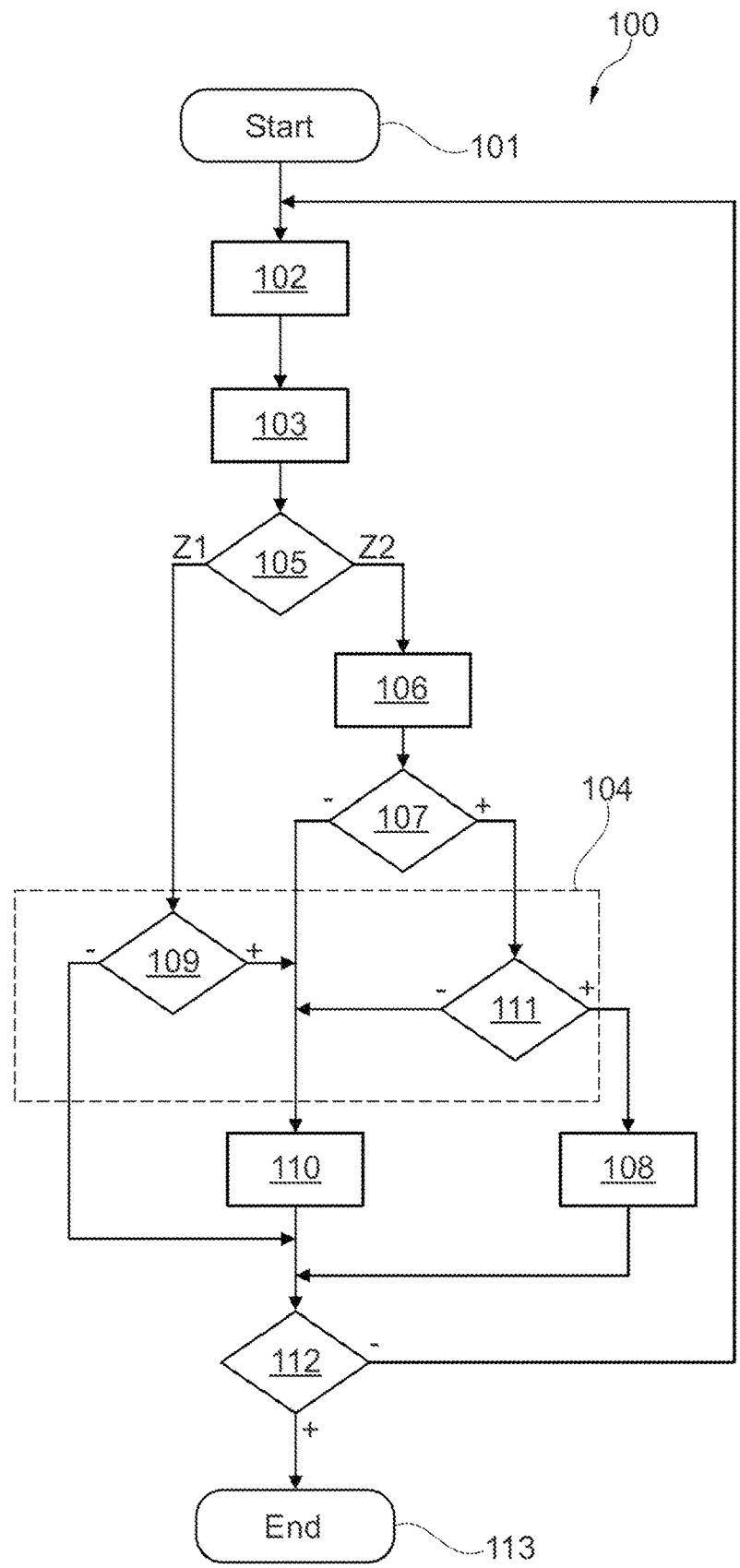
FIG. 1 is a schematic representation of an example of a method for monitoring an object inventory in a cargo space for objects connected to beacon-transmitting devices, according to one embodiment of the present invention.

FIG. 1 shows a flowchart of an example method 100 for monitoring an object inventory in a cargo space for objects connected to beacon-transmitting devices, according to an embodiment of the present invention, wherein the beacon-transmitting devices transmit beacon identification signals individually associated with the respective objects. It does not matter which objects are involved if each of the objects is connected by the signals of a beacon-transmitting device connected to the object, for example glued, clamped, screwed on, built into the object, or connected to or carried by the object in another manner. The method 100 begins in an initial state 101, started for example by a start command controlled by a user or an environmental parameter (for example startup of the vehicle, actuation of a cargo door, time of day, etc.). In one embodiment, it may be provided to load initial settings for operating parameters, for example an initial state of the cargo space, a stored list of a most recently detected object inventory, data sets with most recently applicable or global, i.e. default, initial values for signal strength threshold values and repetition period threshold values at least for the beacon identification signals that identify objects of the most recently detected object inventory. The following steps of the method are repeated until the method is terminated.

In a next step 102, beacon identification signals are received from at least one monitored cargo space. In other words, a cargo space of which the object inventory is to be monitored has a beacon-receiving device via which beacon identification signals can be received if the associated objects with active beacon-transmitting devices are located in the cargo space and possibly within receiving range in the vicinity of (i.e., outside of) the cargo space. The reception range depends on the signal transmission technology used between the transmitting and receiving devices. In a preferred embodiment, a short-range communication technique is used, of which the range is usually less than 100 meters, for example 50 meters, preferably up to 10 meters. For example, the transmitting and receiving devices may be Bluetooth® transmitters and receivers.

In a next step 103, a determination of the respective signal strengths and the associated beacon repetition intervals, i.e. the intervals at which the beacon identification signals that identify the same object are received again, is made for beacon identification signals received by the beacon-receiving device. This determination of the required information from the received signals is carried out via a monitoring device that is connected to the beacon-receiving device and which comprises a suitable interface as well as a control device, for example a computer or other suitably programmed programmable device.

Based on comparisons of the signal strengths of the respective received beacon identification signals with these respectively associated current signal strength threshold values, and comparisons of the respectively associated beacon repetition intervals with these respectively associated current repetition period threshold values, the monitoring device then checks 104 whether the received beacon identification signals identify objects in an object inventory of the cargo space.

In this context, a step 105 of detecting is first provided, via the monitoring device, whether the cargo space is currently in a first state Z1 or a second state Z2, wherein loading operations of objects connected to beacon-transmitting devices in the cargo space are permissible only in the first state Z1, but not in the second state Z2. Since, in the first state Z1, the composition of the object inventory in the cargo space may change due to loading and unloading, while in the second state, the object inventory remains unchanged, i.e. stable, the first state Z1 is also referred to as an unstable state, and the second state Z2 is referred to as a stable state.

Only during the second state, with this method, which does not require tracking the actual, continuously updated position data of the individual objects and is therefore very simple and robust, it is ensured that each object that is located in the cargo space remains there over the entire time period during the second state. Since the object inventory and the arrangement of the objects in the cargo space may change with each loading and unloading operation in the first state Z1, signal strengths and repetition periods of received beacon identification signals detected until then may be subject to changes and modulations due to altered attenuations and shielding, reflections, overlaps and interferences, so that an adjustment or (re)calibration of the associated threshold values is therefore to be carried out if these changes are determined for the objects located in the cargo space, at least during the course of the state. Therefore, only when the cargo space is currently in the second state (indicated by "Z2" in FIG. 1), an adjustment 106 of the current signal strength threshold values and the current repetition period threshold values respectively associated with the respective received beacon identification signals is provided, as a function of the respective associated currently received beacon identification signals and associated beacon repetition periods.

Detecting step 105 whether the cargo space is currently in the first state or the second state may comprise for example determining the second state based on a signal that is received via a user input interface. If the cargo space is part of a vehicle, detecting step 105 whether the cargo space is currently in the first state or the second state may comprise determining the second state by detecting movement of the vehicle at a speed above a speed threshold value, wherein the speed threshold value is preferably selected to be high enough to conclude on the basis thereof that the vehicle is not moving solely for maneuvering.

The step 106 of adjusting the respective current signal strength threshold values associated with the respectively received beacon identification signals, as a function of the respective associated current received beacon identification signals, may, depending on the embodiment, for example comprise, during the second state, determining the respectively associated current signal strength threshold values using a sliding-window function, as a function of a sequence of signal strength values of the respective associated most recently received beacon identification signals, and/or during the second state, determining the respectively associated current signal strength threshold values using a statistical classification method, as a function of a sequence of signal strength values of the respective associated most recently received beacon identification signals, or determining them during the second state using an online machine-learning method, as a function of a sequence of signal strength values of the respective associated most recently received beacon identification signals.

In the embodiment of the method shown in FIG. 1, when the cargo space is currently in the second state, a check 107 is provided for detecting changes in the beacon repetition intervals of the received beacon identification signals. If the beacon repetition interval respectively associated with a beacon identification signal remains constant during the current second state (indicated by "+" in FIG. 1), the object identified by a respective beacon identification signal may be classified at step 108 as being in the object inventory of the cargo space.

In the embodiment of the method shown in FIG. 1, when the cargo space is currently in the second state, it is also provided beforehand that the check in step 104 of whether the received beacon identification signals identify objects in the object inventory of the cargo space comprises a check 111 of whether the signal strengths of the respective received beacon identification signals exceed the current signal strength threshold values respectively associated with them. Only if the respectively associated current signal strength threshold value is exceeded (indicated by "+" in FIG. 1), the object identified by the respective beacon identification signal is classified at step 108 as being in the object inventory of the cargo space. In this context, the step 111 of checking whether the signal strengths of the respective received beacon identification signals exceed the current signal strength threshold values respectively associated with them may comprise for example determining respectively moving signal strength average values for the signal strengths of the respective received beacon identification signals over associated sliding windows comprising a plurality of beacon repetition intervals.

If the check 107 for changes in the beacon repetition intervals of the received beacon identification signals shows that the beacon repetition interval respectively associated with a beacon identification signal does not remain constant during the current second state (indicated by "−" in FIG. 1), or if the check 111 for whether the signal strengths of the respective received beacon identification signals exceed the current signal strength threshold values respectively associated with them shows that the respectively associated current signal strength threshold value is not exceeded (indicated by "−" in FIG. 1), the objects associated with the respective beacon identification signals are classified at step 110 as not being in the object inventory in the embodiment of the method shown in FIG. 1.

If, in the step 105 of detecting whether the cargo space is currently in a first state Z1 or a second state Z2, it is determined that the cargo space is currently in the first state (indicated by "Z1" in FIG. 1), in which first loading operations of objects connected to beacon-transmitting devices in the cargo space are permissible, the step 104 of checking whether the received beacon identification signals identify objects in the object inventory of the cargo space comprises a step 109 for checking whether the current repetition period threshold values associated with beacon repetition periods respectively associated with the respective received beacon identification signals have been exceeded. If this results in the respectively associated current repetition period threshold values being exceeded (indicated by "+" in FIG. 1), the objects associated with the respective beacon identification signals are classified at step 110 as not being in the object inventory. If this is not the case (indicated by "−" in FIG. 1), the object inventory remains unchanged at this point and it is checked in step 112 whether the method should be terminated, for example due to an abort signal received via a user interface. If the method is to be terminated (indicated by "+" in FIG. 1), the method ends at step 113. This may include, for example, storing a list including the current object inventory, and signal strength threshold values and repetition period threshold values currently respectively associated with the objects, in order to be able to be used as suitable initial values when the method is carried out again. If the method is not to be terminated (indicated by "−" in FIG. 1), the reception of beacon identification signals is continued at step 102.

Figure 2:
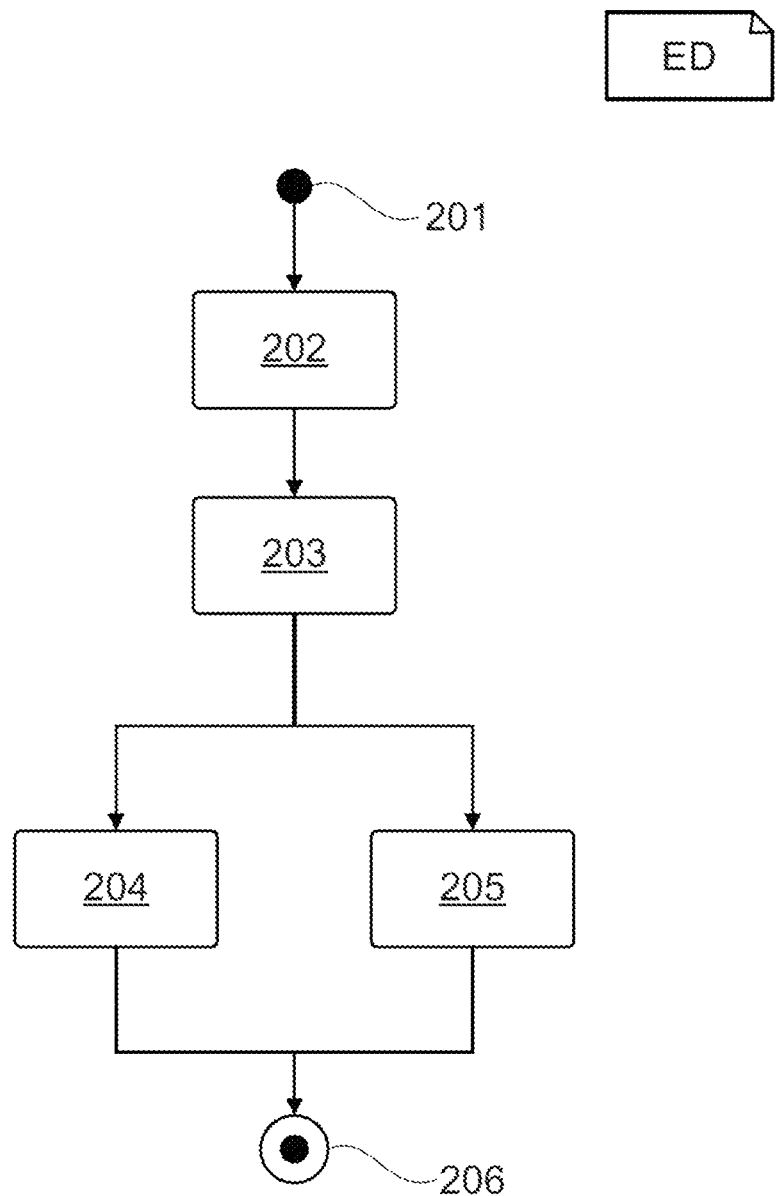
FIG. 2 is a schematic illustration of an example of adjusting current signal strength threshold values and repetition period threshold values associated with received beacon identification signals, for a method for monitoring an object inventory in a cargo space for objects connected to beacon-transmitting devices, according to another embodiment of the present invention.

FIG. 2 shows a flowchart of an example of adjusting current signal strength threshold values and repetition period threshold values associated with received beacon identification signals, for a method for monitoring an object inventory in a cargo space for objects connected to beacon-transmitting devices, according to another embodiment of the present invention. In the situation shown in FIG. 2, beacon identification signals have already been received at the start 201 and are ready for evaluation, shown in FIG. 2 as received data ED. In the example shown, the cargo space is determined in step 202 to be in a second state Z2, in which no loading operations are permitted and which is therefore suitable for adjusting or updating the threshold values associated with the beacon identification signals. In the case of a vehicle, for determining the state, it may for example have been checked that the vehicle is moving at a minimum speed that precludes movement solely for the purpose of maneuvering the vehicle. In the case of a motor vehicle, this minimum speed may for example be more than 5 km/h, for example 30 km/h. In the embodiment shown, the received beacon identification signals, i.e. received data ED, are now evaluated in step 203, and associated signal strengths and beacon repetition intervals or associated beacon repetition frequencies are determined and, based on these current values, an adjustment step 204 of the current signal strength threshold values associated with the respective received beacon identification signals or an adjustment step 205 of the associated repetition period threshold values is performed. In FIG. 2, the method for the current received data ED ends in step 206 or continues with the next received data.

Figure 3:
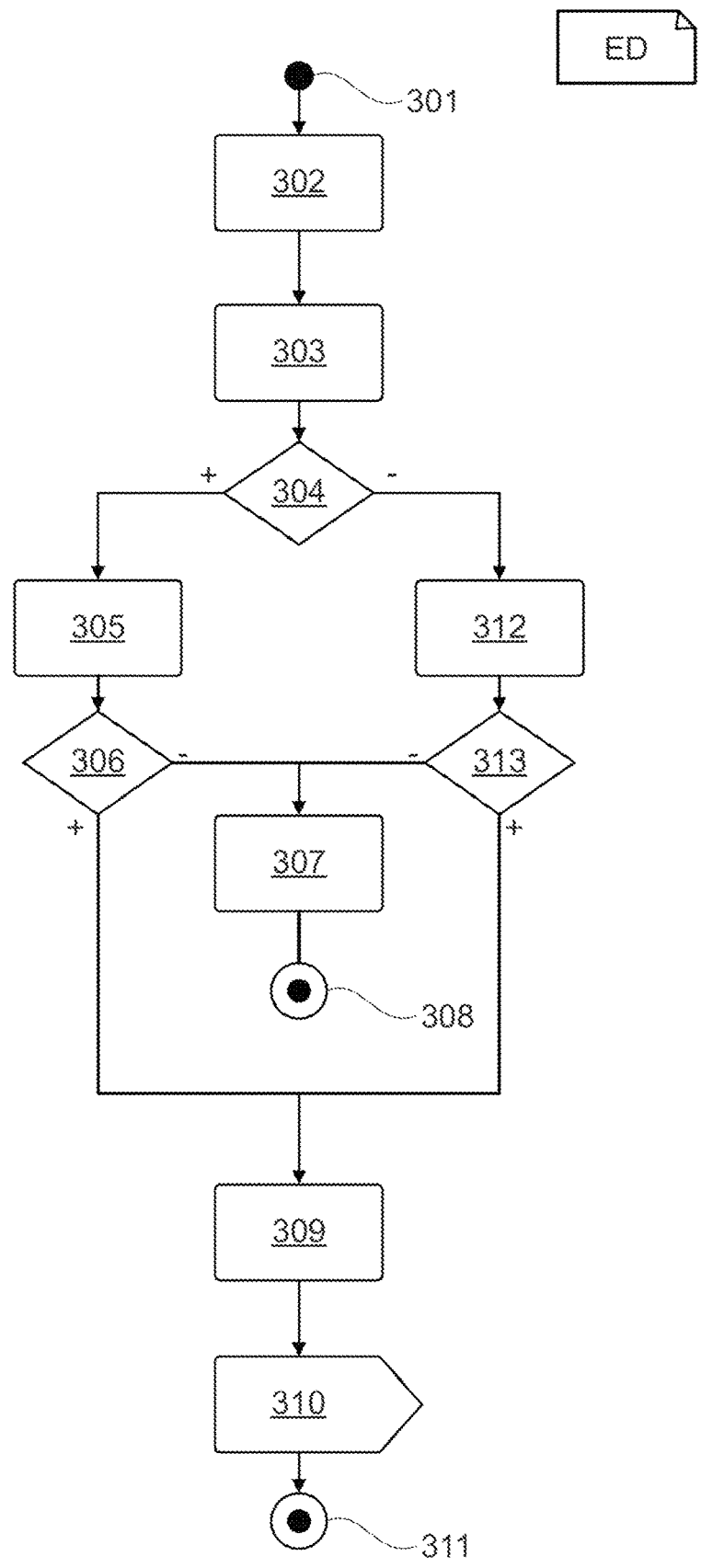
FIG. 3 is a schematic representation of an example of an evaluation of received data for a method for monitoring an object inventory in a cargo space for objects connected to beacon-transmitting devices, according to yet another embodiment of the present invention.

FIG. 3 shows a flowchart for an example method of an evaluation of received data, i.e. beacon identification signals, for monitoring an object inventory in a cargo space for objects connected to beacon-transmitting devices, according to yet another embodiment of the present invention. In this case, the system is in a state Z2 in which no loading operations are permissible. In the embodiment shown, the beacon identification signals, i.e. received data ED, received at the beginning step 301 are now evaluated in step 302, and associated signal strengths and beacon repetition intervals, or associated beacon repetition frequencies, are determined. In addition, the identification, i.e. an identifier or a unique identification feature of the beacon identification signal, is detected in step 303 or read out, and then it is checked in step 304 whether an adjustment of the associated signal strength and repetition period threshold values has already been made beforehand, i.e., whether a calibration already exists for the beacon identification signal. If this is the case (indicated by "+" in FIG. 3), in the next step 305, a comparison is made of the signal strength of the received beacon identification signal with the current signal strength threshold value associated with it. This may be done, for example, as a comparison of the currently sensed RSSI value with an associated current RSSI threshold value.

If a check in step 306 to determine whether the signal strength of the received beacon identification signal exceeds the current signal strength threshold value associated with it shows that the threshold value is not exceeded (indicated by "−" in FIG. 3), the object associated with the beacon identification signal is classified in step 307 as not being in the object inventory and the received data are discarded, and the method ends at step 308 for the current received data ED or continues with the next received data. If the check in step 306 shows that the threshold value has been exceeded (indicated by "+" in FIG. 3), the received beacon identification signal, i.e., the current received data, are classified in step 309 as usable for further processing, in which the decision as to whether the associated object is in the object inventory is to be made on the basis of an entire sequence of received data, for example for determining a moving average value or the like. In an alternative embodiment, the associated object may also be classified directly as being in the object inventory.

In the example shown, it is also provided that the specific data extracted from the current received data, in particular the current signal strength or the current RSSI value, are provided in step 310 for further processing. This may for example include caching the specific data along with the identification, e.g., the identifier, of the object. The depicted method section ends at step 311 initially for the current received data ED or continues with the next received data.

If the check in step 304 to determine whether the associated signal strength and repetition period threshold values have already been adjusted shows that this is not the case (indicated by "−" in FIG. 3), i.e., if no calibration has yet been performed for the beacon identification signal, in a next step 312, a comparison is made of the signal strength of the received beacon identification signal with a general initial signal strength threshold value that is determined independently of the specific beacon identification signal. This can be done for example as a comparison of the currently detected sensed RSSI value with an associated general initial RSSI threshold value. In a preferred embodiment, this general initial signal strength threshold value or initial RSSI threshold value is set high enough that subsequent ambiguous values are unlikely to result in the object being classified as being in the object inventory, but are likely to result in the received data being discarded.

If a check in step 313 to determine whether the signal strength of the received beacon identification signal exceeds the general initial signal strength threshold value shows that the general initial signal strength threshold value is not exceeded (indicated by "−" in FIG. 3), the object associated with the beacon identification signal is classified in step 307 as not being in the object inventory, and the received data are discarded. If the verification step 313 shows that the initial signal strength threshold value has been exceeded (indicated by "+" in FIG. 3), the received beacon identification signal, i.e. the current received data, are classified in step 309 as usable for further processing, and the specific data extracted from the current received data are provided in step 310 for further processing. In an alternative embodiment, the associated object may also be classified directly as being in the object inventory.

Figure 4:
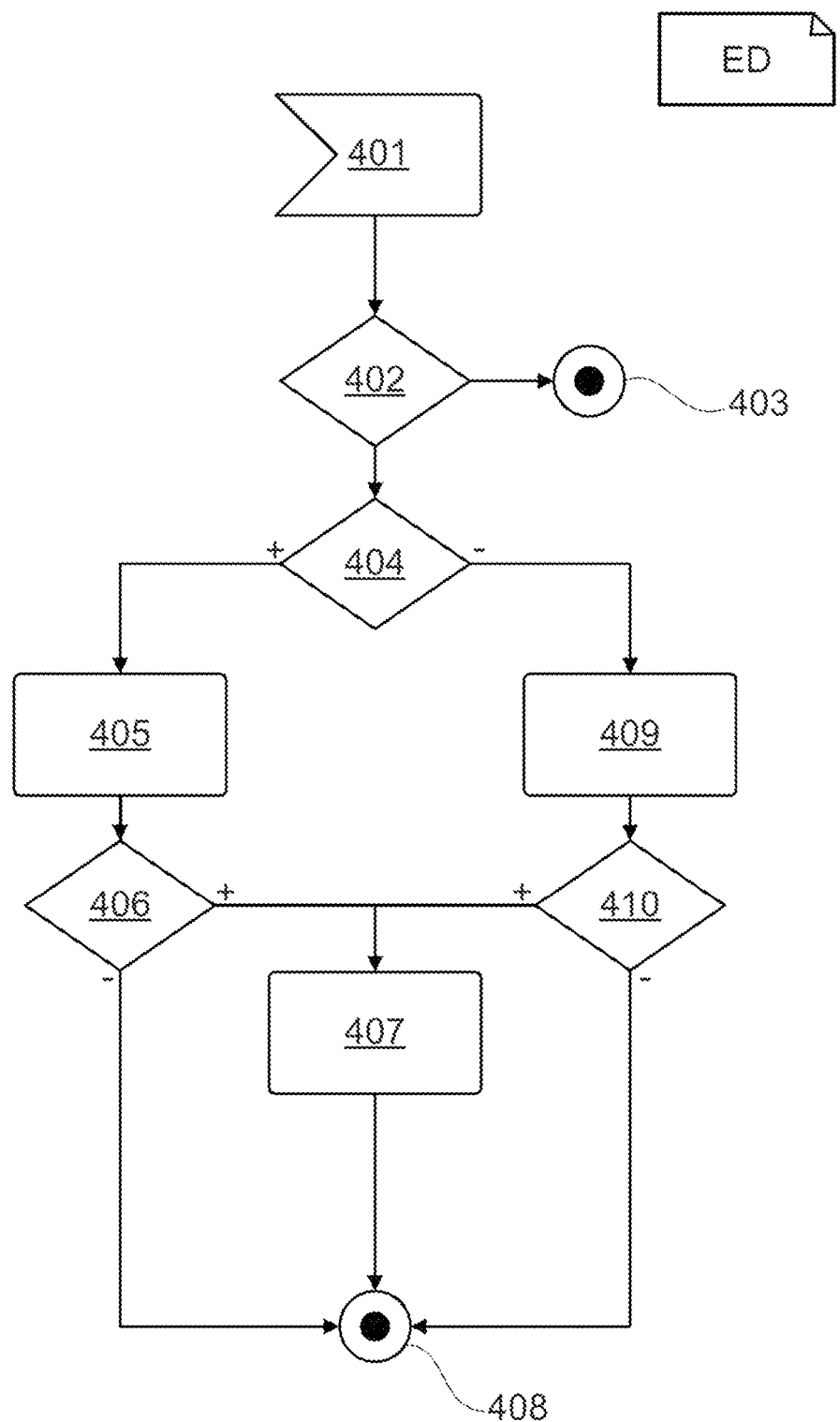
FIG. 4 is a schematic representation of an example of updating the object inventory for a method for monitoring an object inventory in a cargo space for objects connected to beacon-transmitting devices, according to yet another embodiment of the present invention.

FIG. 4 shows a flowchart of an example method of updating the object inventory for monitoring an object inventory in a cargo space for objects connected to beacon-transmitting devices, according to yet another embodiment of the present invention. In this case, the system is in a state Z2 in which no loading operations are permissible. Specific data extracted from the current received data ED, e.g., the current received beacon identification signal, are provided at step 401. In a preferred embodiment, said data were determined and provided in an evaluation such as that shown in FIG. 3.

In a next step 402, a check is made to determine whether a minimum number of detections using usable extracted specific data have already been made for the beacon identification signal, i.e., whether repetitions of the beacon detection signal are already being received over a minimum number of associated repetition periods. If this is not the case (indicated by "−" in FIG. 4), the update is terminated at step 403 or continued with other received data. The specific data provided are not discarded but are cached in case further detections follow. If a minimum number of detections with usable extracted specific data have already been performed for the beacon identification signal (indicated by "+" in FIG. 4), it is checked in step 404 whether the associated signal strength and repetition period threshold values have already been adjusted, i.e., whether a calibration already exists for the beacon identification signal. If this is the case (indicated by "+" in FIG. 4), in a following step, a determination is made of a moving average value for the signal strength of the received beacon identification signal over a sliding window, the length of which, in one embodiment, corresponds to the duration of the minimum number of associated repetition periods, and a comparison is made in step 405 of the average value with a current signal strength threshold value associated with the respective beacon identification signal. This may take place, for example, as a comparison of the average currently detected RSSI value with an associated current RSSI threshold value. In one embodiment, the current threshold value is adjusted or updated using a machine-learning method based on the previously received beacon identification signal. If a check in step 406 to determine whether the average signal strength of the received beacon identification signal exceeds the current signal strength threshold value associated with it shows that the threshold value is not exceeded (indicated by "−" in FIG. 3), the update is terminated at step 408 or continued with other received data. If the check in step 406 shows that the threshold value is exceeded (indicated by "+" in FIG. 4), the object associated with the received beacon identification signal is classified in step 407 as being in the object inventory of the cargo space.

If the check in step 404 of whether an adjustment of the associated signal strength and repetition period threshold values has already been performed previously shows that this is not the case (indicated by "−" in FIG. 3), i.e., if no calibration is yet available for the beacon identification signal, in a next step, a determination is made of a moving average value for the signal strength of the received beacon identification signal over a sliding window, the length of which, in one embodiment, corresponds to the duration of the minimum number of associated repetition periods, and a comparison is made in step 409 of the average value of the signal strength of the received beacon identification signal with a general initial signal strength threshold value that is determined independently of the specific beacon identification signal. If a check in step 410 to determine whether the average signal strength of the received beacon identification signal exceeds the general initial signal strength threshold value shows that the threshold value is not exceeded (indicated by "−" in FIG. 3), the update is terminated at step 408 or continued with other received data. If the check in step 410 shows that the threshold value is exceeded (indicated by "+" in FIG. 4), the object associated with the received beacon identification signal is classified in step 407 as being in the object inventory of the cargo space.

Figure 5:
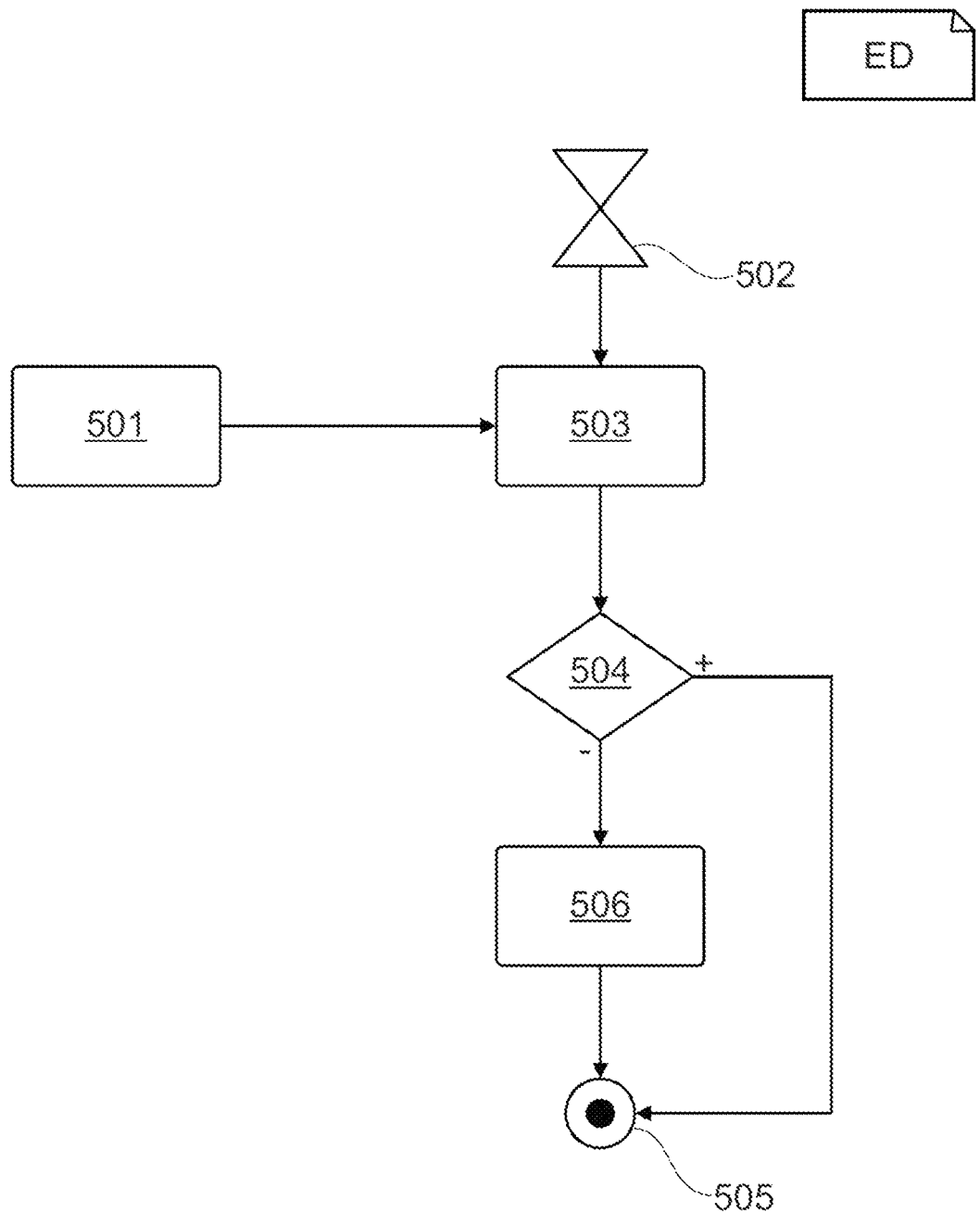
FIG. 5 is a schematic representation of a further example of updating the object inventory for a method for monitoring an object inventory in a cargo space for objects connected to beacon-transmitting devices, according to yet another embodiment of the present invention.

FIG. 5 shows a flowchart of another example of updating the object inventory for a method for monitoring an object inventory in a cargo space for objects connected to beacon-transmitting devices, according to yet another embodiment of the present invention. In the example shown, the cargo space is in a state Z1 in which loading operations are permissible. In this case, information stored for objects from the object inventory at the time of the last update and the repetition period associated with the beacon information signal associated with the object are provided in step 501, for example, retrieved from an object inventory list or database. At fixed time intervals 502, for example every two seconds, or at time intervals of which the duration corresponds at least to the associated repetition period or is preferably a multiple thereof, it is then determined in step 503 when the associated beacon identification signal was last detected. If a check in step 504 to determine whether a current repetition period threshold value associated with the respective object or the beacon repetition interval of the associated beacon identification signal has been exceeded shows that the associated beacon identification signal was detected again before reaching the repetition period threshold value (indicated by "+" in FIG. 5), the object is still classified as being in the object inventory, and the check of the object ends at step 505 for the time being, wherein it is possible to continue with the next object or to repeat the check as long as the cargo space remains in the state in which loading operations are permissible, i.e. the object inventory can change. If the check in step 504 that the associated current repetition period threshold value has been exceeded shows that the associated beacon identification signal was not detected again before the repetition period threshold value was reached (indicated by "−" in FIG. 5), the object is classified in step 506 as no longer being in the object inventory.

Figure 6:
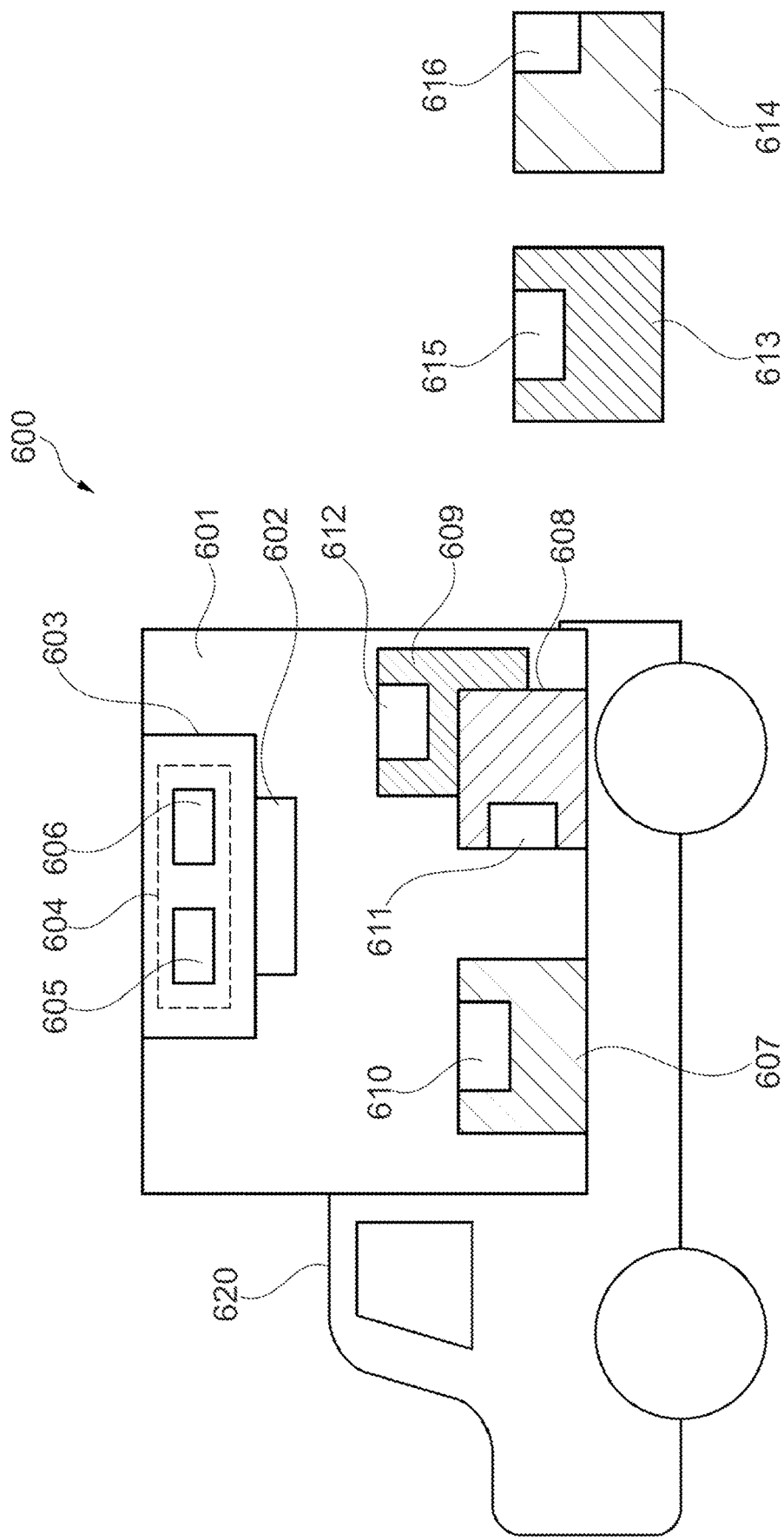
FIG. 6 is a schematic representation of an example of a vehicle comprising a system for monitoring an object inventory in a cargo space for objects connected to beacon-transmitting devices, according to yet another embodiment of the present invention.

FIG. 6 shows a schematic representation of an example of a vehicle comprising a system for monitoring an object inventory in a cargo space for objects connected to beacon-transmitting devices, according to yet another embodiment of the present invention. The vehicle 620 comprises a system 600 for monitoring an object inventory in a cargo space 601 for objects connected to beacon-transmitting devices, wherein in the embodiment shown, the objects with their beacon-transmitting devices are also components of the system. The objects are shown in FIG. 6 as boxes or packages with transmitting devices attached to them over a flat surface. However, said objects may also be other objects, for example tools or personal items, which contain suitable transmitting devices or are attached to said devices. In the situation shown in FIG. 6, some objects 607, 608, 609 with beacon-transmitting devices 610, 611, 612 are loaded in cargo space 601, while other objects 613, 614 with beacon-transmitting devices 615, 616 are outside cargo space. The beacon-transmitting devices 610, 611, 612, 615, 616 transmit beacon identification signals that are individually associated with the respective objects 607, 608, 609, 613, 614.

The vehicle 620 is depicted as a delivery van with a cargo space 601. Depending on the objects to be loaded, the cargo space may for example also be the trunk or the passenger compartment of a passenger vehicle.

The system 600 comprises a beacon-receiving device 602 for receiving beacon identification signals from at least the cargo space 601. For this purpose, in the embodiment shown, the receiving device 602 is arranged in the cargo space 601 itself. A monitoring device 603 is connected to the beacon-receiving device 602. In the embodiment shown, said monitoring device comprises a programmable device 603 that has in particular a processor 605 and a memory 606 with a computer program product that comprises sections of code which, when executed by the processor 605 of the programmable device 604 of the system 600, cause the system 600 to execute a method for monitoring an object inventory in a cargo space for objects connected to beacon-transmitting devices, for example the method 100 illustrated in FIG. 1. In this way, a robust system is available in which it can be easily monitored whether or not objects are in the cargo space, based only on the detection and evaluation of the individual beacon identification signals.

It is understood that in the various embodiments of the method according to the present invention, the method steps, although described according to a certain ordered sequence, could in part be carried out in a sequence different from that described herein. It is further understood that certain steps could be performed simultaneously or sequentially, singly or multiple times, that other steps could be added, or that certain steps described herein could be omitted. In other words, the present descriptions are provided for the purpose of illustrating specific embodiments and should not be construed as limiting the disclosed subject matter.

The term "and/or" as used in the description, when used in a series of two or more elements, means that any of the listed elements may be used alone, or any combination of two or more of the listed elements may be used. For example, if a composition is described as comprising components A, B, and/or C, the composition may comprise A alone; B alone; C alone; A and B in combination; A and C in combination; B and C in combination; or A, B, and C in combination.

LIST OF REFERENCE SIGNS

100 Method
101 Start
102 Receive beacon identification signals from at least one monitored cargo space
103 Determine signal strengths of received beacon identification signals and beacon repetition periods.
104 Check whether the received beacon identification signals identify objects in an object inventory of the cargo space.
105 Detect whether the cargo space is currently in a first state or a second state
106 Adjust the current signal strength threshold values and repetition period threshold values associated with the respective received beacon identification signals.
107 Check for changes in the beacon repetition intervals of the received beacon identification signals
108 Classify an object identified by a respective beacon identification signal as being in the object inventory
109 Check whether the current repetition period threshold values respectively associated with beacon repetition periods associated with the respective received beacon identification signals have been exceeded.

110 Classify the objects associated with the respective beacon identification signals as not being in the object inventory.
111 Check whether the signal strengths of the respective received beacon identification signals exceed the current signal strength threshold values respectively associated with them.
112 Check whether the method is to be terminated
113 End
201 Start
202 Determine that the cargo space is in the second state
203 Evaluate received data
204 Adjust the current signal strength threshold values associated with the received beacon identification signals
205 Adjust the associated repetition period threshold values
206 End
301 Start
302 Evaluate received data
303 Detect the identification of the beacon identification signal
304 Check whether the associated signal strength and repetition period threshold values have already been previously adjusted
305 Compare the signal strength of the received beacon identification signal with the associated current signal strength threshold value
306 Check whether the signal strength of the received beacon identification signal exceeds the associated current signal strength threshold value
307 Classify an object identified by a beacon identification signal as not being in the object inventory
308 End
309 Classify a beacon identification signal as being usable for further processing
310 Provide the specific data extracted from the current received data for further processing
311 End
312 Compare the signal strength of the received beacon identification signal with a general initial signal strength threshold value
313 Check whether the signal strength of the received beacon identification signal exceeds the general initial signal strength threshold value
401 Provide the specific data extracted from the current received data
402 Check whether a minimum number of detections have been made with usable extracted specific data
403 Finish update
404 Check whether an adjustment of the associated signal strength and repetition period threshold values has already been made
405 Determine a moving average value and compare it with a current signal strength threshold value associated with the respective beacon identification signal
406 Check whether the average signal strength of the received beacon identification signal exceeds the associated current signal strength threshold value
407 Classify the object associated with the received beacon identification signal as being in the object inventory of the cargo space
408 Finish update
409 Compare the average value of the signal strength of the beacon identification signal with an initial signal strength threshold value
410 Check whether the average signal strength of the beacon identification signal exceeds the initial signal strength threshold value
501 Provide information stored for objects from the object inventory
502 Determined time interval
503 Determine when the associated beacon identification signal was last detected
504 Check whether a current repetition period threshold value associated with the associated beacon identification signal has been exceeded
505 Terminate the check of the object
506 Classify the object as no longer being in the object inventory
600 System
601 Cargo space
602 Beacon-receiving device
603 Monitoring device
604 Programmable device
605 Processor
606 Memory
607 Object
608 Object
609 Object
610 Beacon-transmitting device
611 Beacon-transmitting device
612 Beacon-transmitting device
613 Object
614 Object
615 Beacon-transmitting device
616 Beacon-transmitting device
ED Received data
Z1 First state
Z2 Second state

What is claimed is:

1. A method for monitoring an object inventory in a cargo space for objects connected to respective beacon-transmitting devices, wherein the beacon-transmitting devices transmit beacon identification signals individually associated with the respective objects, the method comprising the steps of:
receiving beacon identification signals from at least one monitored cargo space using a beacon-receiving device;
determining signal strengths of received beacon identification signals and beacon repetition periods associated therewith using a monitoring device connected to the beacon-receiving device;
checking whether each received beacon identification signal identifies a respective object in the object inventory of the cargo space based on comparisons of the signal strengths of the respective received beacon identification signals with current signal strength threshold values respectively associated with them and on comparisons of the respectively associated beacon repetition periods with respective associated current repetition period threshold values;
detecting whether the cargo space is currently in a first state or a second state, wherein loading and unloading operations of the objects connected to beacon-transmitting devices in the cargo space are permissible in the first state and not permissible in the second state; and
adjusting the respective current signal strength threshold values respectively associated with the respective received beacon identification signals and respectively associated current repetition period threshold values in response to signal strengths of received beacon identification signals and beacon repetition periods determined only during the second state.

2. The method of claim 1, wherein the step of detecting whether the cargo space is currently in the first state or the second state comprises identifying the second state in response to a signal that is received via a user input interface.

3. The method of claim 1, wherein the cargo space is part of a vehicle, and wherein the step of detecting whether the cargo space is currently in the first state or the second state comprises identifying the second state in response to movement of the vehicle at a speed above a speed threshold value.

4. The method of claim 1, further comprising the steps of:
checking for changes in the beacon repetition intervals of the received beacon identification signals when the cargo space is in the second state; and
classifying an object identified by a respective beacon identification signal as being in the object inventory only if the respectively associated beacon repetition interval remains constant during the current second state.

5. The method of claim 1, wherein the step of checking whether the received beacon identification signals identify objects in the object inventory of the cargo space is comprised of checking whether the current repetition period threshold values respectively associated with respective beacon repetition periods associated with the respective received beacon identification signals have been exceeded, and wherein the method further comprises the step of:
classifying the objects associated with the respective beacon identification signals as not being in the object inventory when the respectively associated current repetition period threshold values are exceeded while the cargo space is in the first state.

6. The method of claim 1, wherein the step of checking whether the received beacon identification signals identify objects in the object inventory of the cargo space is comprised of checking whether the signal strengths of the respective received beacon identification signals exceed the current signal strength threshold values respectively associated with them, and wherein the method further comprises the step of:
classifying an object identified by a respective beacon identification signal as being in the object inventory only if the respectively associated current signal strength threshold value is exceeded when the cargo space is currently in the second state.

7. The method of claim 6, wherein, in order to check whether the signal strengths of the respective received beacon identification signals exceed the current signal strength threshold values respectively associated with them, respective signal strength moving average values are determined for the signal strengths of the respective received beacon identification signals over associated sliding windows comprising several beacon repetition periods.

8. The method of claim 1, wherein the step of adjusting the current signal strength threshold values respectively associated with respective received beacon identification signals is comprised of determining the respectively associated current signal strength threshold values during the second state using a sliding-window function, which is a function of a sequence of signal strength values of the respective associated most recently received beacon identification signals.

9. The method of claim 1, wherein the step of adjusting the current signal strength threshold values respectively associated with respective received beacon identification signals is comprised of determining the respectively associated current signal strength threshold values during the second state using a statistical classification method, which is a function of a sequence of signal strength values of the respective associated most recently received beacon identification signals.

10. The method of claim 1, wherein the step of adjusting the current signal strength threshold values respectively associated with respective received beacon identification signals is comprised of determining the respectively associated current signal strength threshold values during the second state with an online machine-learning method, which is a function of a sequence of signal strength values of the respective associated most recently received beacon identification signals.

11. A system for monitoring an object inventory in a cargo space for objects connected to beacon-transmitting devices, wherein the beacon-transmitting devices transmit beacon identification signals individually associated with the respective objects, comprising:
a cargo space configured to receive the objects connected to beacon-transmitting devices;
a beacon-receiving device for receiving beacon identification signals from the beacon-transmitting devices at least from the cargo space; and
a monitoring device connected to the beacon-receiving device and comprising a programmable device, wherein the programmable device is configured to:
determine signal strengths of received beacon identification signals and beacon repetition periods associated therewith using the monitoring device;
check whether each received beacon identification signal identifies a respective object in the object inventory of the cargo space based on comparisons of the signal strengths of the respective received beacon identification signals with current signal strength threshold values respectively associated with them and on comparisons of the respectively associated beacon repetition periods with respective associated current repetition period threshold values;
detect whether the cargo space is currently in a first state or a second state, wherein loading and unloading operations of the objects connected to beacon-transmitting devices in the cargo space are permissible in the first state and not permissible in the second state; and
adjusting the respective current signal strength threshold values respectively associated with the respective received beacon identification signals and respectively associated current repetition period threshold values in response to signal strengths of received beacon identification signals and beacon repetition periods determined only during the second state.

12. The system of claim 11, wherein the programmable device is configured to detect whether the cargo space is currently in the first state or the second state by identifying the second state in response to a signal that is received via a user input interface.

13. The system of claim 11, wherein the cargo space is part of a vehicle, and wherein the programmable device is configured to detect whether the cargo space is currently in the first state or the second state by identifying the second state in response to movement of the vehicle at a speed above a speed threshold value.

14. The system of claim 11, wherein the programmable device is configured to check for changes in the beacon repetition intervals of the received beacon identification signals when the cargo space is in the second state, and to classify an object identified by a respective beacon identification signal as being in the object inventory only if the respectively associated beacon repetition interval remains constant during the current second state.

15. The system of claim 11, wherein checking whether the received beacon identification signals identify objects in the object inventory of the cargo space is comprised of the programmable device checking whether the current repetition period threshold values respectively associated with respective beacon repetition periods associated with the respective received beacon identification signals have been exceeded, and wherein the programmable device is further configured to classify the objects associated with the respective beacon identification signals as not being in the object inventory when the respectively associated current repetition period threshold values are exceeded while the cargo space is in the first state.

16. The system of claim 11, wherein checking whether the received beacon identification signals identify objects in the object inventory of the cargo space is comprised of the programmable device checking whether the signal strengths of the respective received beacon identification signals exceed the current signal strength threshold values respectively associated with them, and wherein the programmable device is further configured to classify an object identified by a respective beacon identification signal as being in the object inventory only if the respectively associated current signal strength threshold value is exceeded when the cargo space is currently in the second state.

17. The system of claim 11, wherein checking whether the signal strengths of the respective received beacon identification signals exceed the current signal strength threshold values respectively associated with them is based on using respective signal strength moving average values to determine the signal strengths of the respective received beacon identification signals over associated sliding windows comprising several beacon repetition periods.

18. The system of claim 11, wherein the programmable device adjusts the current signal strength threshold values respectively associated with respective received beacon identification signals by determining the respectively associated current signal strength threshold values during the second state using a sliding-window function, which is a function of a sequence of signal strength values of the respective associated most recently received beacon identification signals.

19. The system of claim 11, wherein the programmable device adjusts the current signal strength threshold values respectively associated with respective received beacon identification signals by determining the respectively associated current signal strength threshold values during the second state using a statistical classification method, which is a function of a sequence of signal strength values of the respective associated most recently received beacon identification signals.

20. The system of claim 11, wherein the programmable device adjusts the current signal strength threshold values respectively associated with respective received beacon identification signals by determining the respectively associated current signal strength threshold values during the second state with an online machine-learning method, which is a function of a sequence of signal strength values of the respective associated most recently received beacon identification signals.

* * * * *